(12) United States Patent
Nakajima

(10) Patent No.: US 7,508,588 B2
(45) Date of Patent: Mar. 24, 2009

(54) MICRO LENS ARRAY AND ITS MANUFACTURING METHOD

(75) Inventor: Toshihiro Nakajima, Hamamatsu (JP)

(73) Assignee: Yamaha Corporation, Shizuoka-Ken (JP)

( * ) Notice: Subject to any disclaimer, the term of this patent is extended or adjusted under 35 U.S.C. 154(b) by 22 days.

(21) Appl. No.: 11/551,456

(22) Filed: Oct. 20, 2006

(65) Prior Publication Data
US 2007/0127326 A1 Jun. 7, 2007

(30) Foreign Application Priority Data
Oct. 20, 2005 (JP) ............... 2005-305379

(51) Int. Cl.
G02B 27/10 (2006.01)
G02B 13/18 (2006.01)
G02B 3/06 (2006.01)
(52) U.S. Cl. .................... 359/619; 359/711
(58) Field of Classification Search ........... 359/619, 359/620, 626, 628, 641, 711
See application file for complete search history.

(56) References Cited

U.S. PATENT DOCUMENTS

| | | |
|---|---|---|
| 5,415,727 A | 5/1995 | Gal et al. |
| 5,790,576 A | 8/1998 | Waarts et al. |
| 6,075,650 A | 6/2000 | Morris et al. |

FOREIGN PATENT DOCUMENTS

| | | |
|---|---|---|
| EP | 0 286 368 A2 | 10/1988 |
| EP | 1 531 346 A1 | 5/2005 |
| JP | 09-501789 | 2/1997 |
| JP | 09-096760 | 4/1997 |
| JP | 2002-513959 | 5/2002 |
| WO | WO 95/34015 | 12/1995 |
| WO | WO 99/57791 | 11/1999 |
| WO | WO-00/33121 | 6/2000 |

OTHER PUBLICATIONS

Daniel H. Raguin, et al., "Anamorphic and Aspheric Microlenses and Microlens Arrays for Telecommunication Application," 2000 Optical Society of America, pp. MK1-1-MK1-3.

Primary Examiner—Alicia M Harrington
(74) Attorney, Agent, or Firm—Dickstein Shapiro LLP

(57) ABSTRACT

Pluralities of lens parts 20, 22 are formed on a lens substrate 16 by dry-etching. The lens parts 20 and 22 have same structures, and the lens part 20 includes toroidal lens surfaces S1 and S2 opposing to each other on one principal surface and another principal surface of the substrate 16. Assuming that a cross section in a y-axis direction of a laser beam emitted from a laser active layer in a z-axis direction is long and narrow in an x-axis direction, the lens surface S2 is formed to have a radius of curvature $R_{21}$ in the x-axis direction smaller than a radius of curvature $R_{22}$ in the y-axis direction, and the lens surface S1 is formed to have a radius of curvature $R_{11}$ in the x-axis direction smaller than a radius of curvature $R_{12}$ in the y-axis direction.

4 Claims, 12 Drawing Sheets

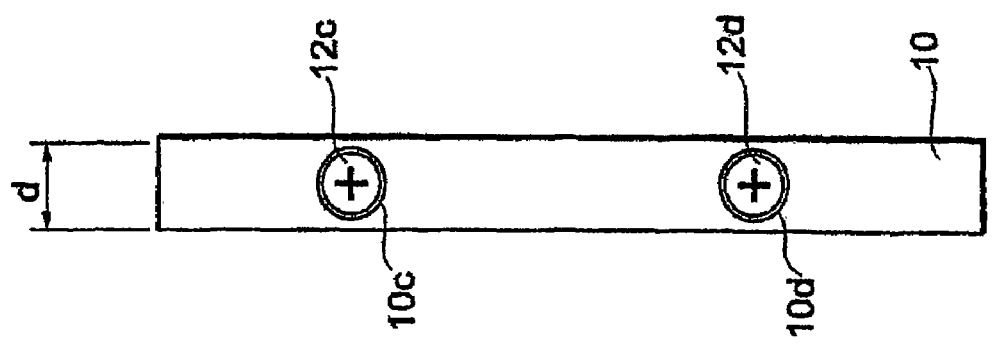
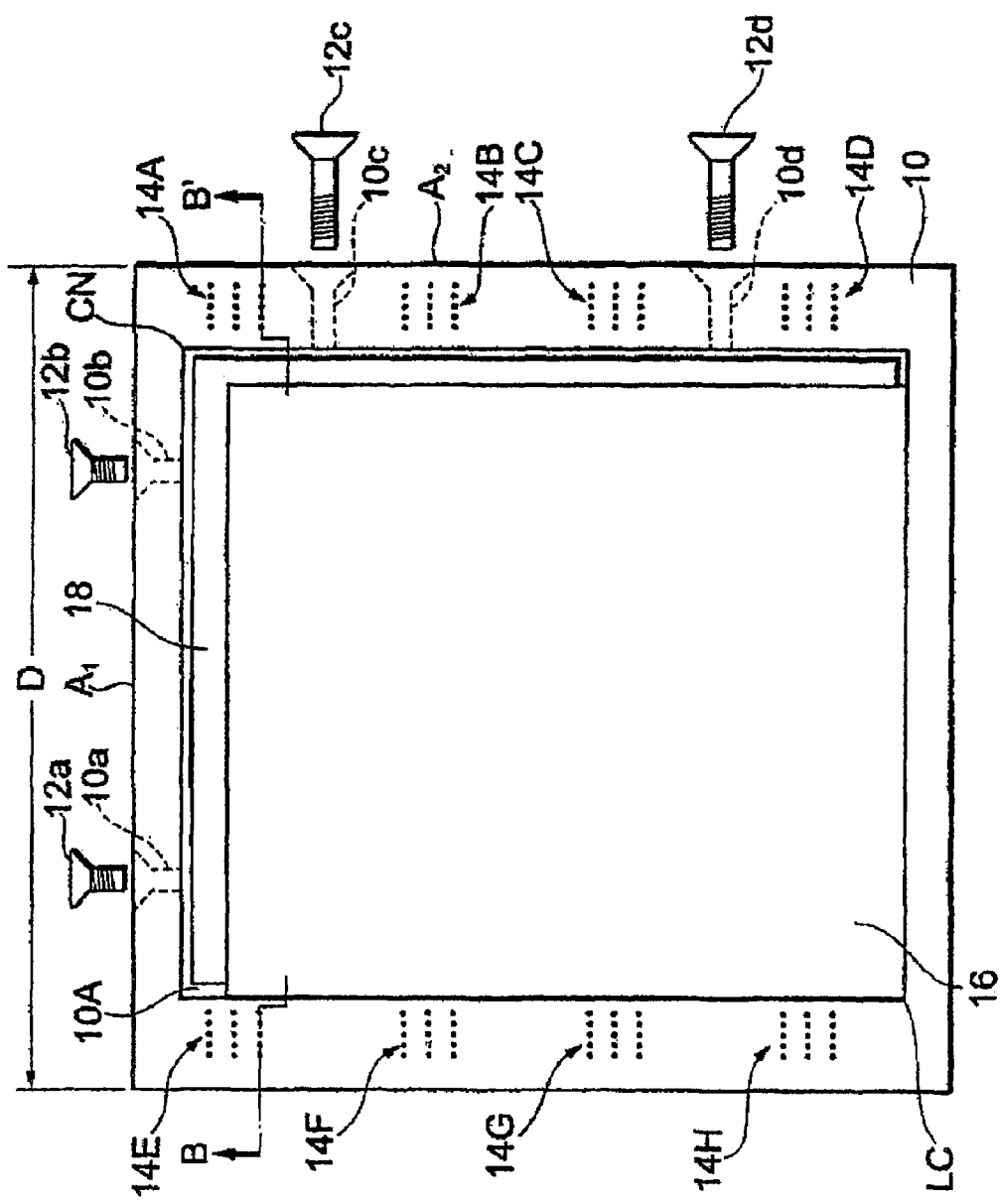

MICRO LENS ARRAY AND ITS MANUFACTURING METHOD

CROSS REFERENCE TO RELATED APPLICATION

This application is based on Japanese Patent Application 2005-305379, filed on Oct. 20, 2005, the entire contents of which are incorporated herein by reference.

BACKGROUND OF THE INVENTION

A) Field of the Invention

This invention relates to a micro lens array suited for restraining dispersion of an optical beam such a laser beam and a manufacturing method of the micro lens array.

B) Description of the Related Art

Conventionally a scanning printing (or recording) device such as a laser printer, etc. uses a semiconductor laser shown in FIG. 23 as a light source.

The semiconductor laser emits a laser beam 3 from a laser active layer 2 on a side surface 1A of a semiconductor substrate 1. The active layer 2 is configured to have a belt shape on the substrate side surface 1A. Defining a longitudinal direction L and a direction of thickness t of the active layer 2 respectively as an x-axis and a y-axis, an emitting direction of the laser beam 3 will be a positive direction on a z-axis crossing with an x-y coordinate surface (orthogonal coordinates surface) at a right angle. The x-axis, y-axis and z-axis are respectively corresponding to a slow axis, a fast axis and an optical axis in a laser scanning.

The laser beam 3 normally disperses by about 10 degrees in the x-axis direction and by about 20-30 degrees in the y-axis direction. In order to restrain these dispersion of the laser beam and to concentrate light onto an edge of an optical fiber, etc., for example, it is well known to use an optical system as shown in FIG. 24 (refer to Japanese Laid-Open Patent H09-96760).

In the optical system shown in FIG. 24, laser beams 3a-3c emitted from the semiconductor laser 1 are concentrated into the y-axis direction by a semi-cylindrical lens surface 5 formed on one principal surface of a lens substrate 4 and concentrated into the x-axis direction respectively by spherical lens surfaces 6a-6c formed on another principal surface of the lens substrate 4. The concentrated laser beams 3a-3c propagate to the z-axis direction and irradiated to edge surfaces of optical fibers 7a-7c. It is possible to form the lens surface 5 (or the lens surfaces 6a-6c) on a separate lens substrate from the lens substrate 4 having the lens surfaces 6a-6c (or the lens surface 5). However, if the lens surface 5 and the lens surfaces 6a-6c are unitedly formed on the lens substrate 4 as shown in FIG. 24 and at the same time a radius of curvatures of the lens surface 5 and the lens surfaces 6a-6c independently form each other in accordance with a divergence angle of the laser beam, it will be possible to realize a small and high-performance micro lens array for concentrating light.

As for an optical system for restraining light dispersion, the optical system shown in FIG. 25 has been well known (refer to published Japanese translation of a PCT application JPA 2002-513959). Laser beams emitted from active layers 3A, 3B and 3C of a semiconductor laser 1 irradiate to a lens substrate 9 via a lens substrate 8 having a cylindrical lens 8S. A cylinder axis of the lens 8S extends to the x-axis direction. Cylindrical lens surfaces 9A, 9B and 9C are formed respectively in correspondence with the active layers 3A, 3B and 3C on one principal surface of the lens substrate 9 opposing to the lens 8S, and cylindrical lens surfaces 9a, 9b and 9c are formed respectively in correspondence with the lens surfaces 9A, 9B and 9C on another principal surface of the lens substrate 9. The cylinder axes of the lens surfaces 9A, 9B and 9C and the lens surfaces 9a, 9b and 9c extend to the y-axis direction.

FIG. 26 shows collimation in the y-axis direction of the optical system shown in FIG. 25. The reference number "$3y$" in the drawing represents an active part corresponding to a thickness t of one active layer (e.g., the active layer 3A). A laser beam emitted from the active part $3y$ is collimated by the lens 8S and transmitted via the lens substrate 9.

FIG. 27 shows formation of beam waist in the x-axis direction of the optical system shown in FIG. 25. An active layer $3x$ corresponds to the length L of one active layer (e.g., the active layer 3A). A laser beam emitted from the active layer $3x$ is irradiated to the lens substrate 9 via the lens 8S. In the lens substrate 9, the laser beam is refracted by the lens 9A and thereafter the beam waist BW is formed by the telescope effect near the center of the substrate and the laser beam again is refracted by the lens 9a. Where a dispersion angle on an irradiating side of the lens 9A is "$\alpha$" and a beam width and a dispersion angle on an emitting side of the lens 9a are respectively "Lo" and "$\beta$", "$\alpha L$" will be "$\beta Lo$" ($\alpha L = \beta Lo$) by Lagrange Invariant, and "$\beta$" will be smaller than "$\alpha$" ($\beta < \alpha$), i.e., the divergence angle "$\beta$" will be smaller than the divergence angel "$\alpha$", because "Lo" is larger than "L" (Lo>L).

Conventionally it is well known that a laser beam shaper converts a laser beam having an oval cross section into a laser beam having a circle cross section by passing the laser beam through one side surface to another side surface of a cylindrical transparent body (refer to published Japanese translation of a PCT application JPA H09-501789). In this case, a cylindrical concave lens surface is formed on one side surface (irradiated surface) of the cylindrical transparent body, and a toroidal lens surface (convex lens surface in a donut-like shape wherein radiuses of curvature are different in two different directions crossing with each other at a right angle) is formed on another side surface (emitting surface) of the cylindrical transparent body.

According to the above-described conventional technique shown in FIG. 24, when the lens substrate 4 having the lens surfaces 5 and 6a-6c is used as a collimator, it is necessary to arrange the semiconductor laser 1 sufficiently apart from the lens substrate 4. By arranging the semiconductor substrate 1 apart from the lens substrate 4, adjoining laser beams such as the laser beams 3a and 3b may be overlapped with each other, and a necessary arrangement space may be increased. The lens substrate 4 having the lens surfaces 5 and 6a-6c dose not have the telescope effect as in FIG. 27; therefore, the beam waist cannot be formed inside the substrate 4.

According to the above-described conventional technique shown in FIG. 25, it is necessary to define positions of two lens substrates 8 and 9 precisely toward the semiconductor laser 1. Therefore, it takes more time to position two substrates and a positioning gap may be easily occurred by change in an environment. Moreover, it needs more parts so that a manufacturing cost will be increased, and miniaturization of the optical system will be restrained.

According to the above-described laser beam shaper, addition of a collimator lens might be necessary to further decrease an opening angle of the laser beam emitted from an emitting surface. Furthermore, the above-described laser beam shaper does not have the telescope effect as in FIG. 27.

SUMMARY OF THE INVENTION

It is an object of the present invention to provide a micro lens array having a collimate function and a telescope function.

It is another object of the present invention to provide a manufacturing method for a micro lens array having a collimate function and a telescope function.

According to one aspect of the present invention, there is provided a micro lens array, comprising: a lens substrate; a first toroidal lens surface formed on one principal surface of the lens substrate, a radius of curvature $R_{11}$ in a first direction being smaller than a radius of curvature $R_{12}$ in a second direction crossing with the first direction at a right angle; and a second toroidal lens surface formed on another principal surface of the lens substrate, a radius of curvature $R_{21}$ in the first direction being smaller than a radius of curvature $R_{22}$ in the second direction, and wherein a beam waist of an optical beam irradiating from the first lens surface and emitted from the second lens surface is formed in the lens substrate in the first direction, and the optical beam is collimated in the second direction.

According to the micro lens array of the present invention, the first and the second lens surfaces are formed on one principal surface and another principal surface of the lens substrate, and at the same time, conditions of the radiuses of curvatures $R_{11}$, $R_{12}$, $R_{21}$ and $R_{22}$ are set to satisfy that $R_{11}$ will be smaller than $R_{12}$ ($R_{11}<R_{12}$) and $R_{21}$ will be smaller than $R_{22}$ ($R_{21}>R_{22}$), and the beam waist is formed on the lens substrate in the first direction and the laser beam is collimated in the second direction. Therefore, both of the telescope function and the collimated function can be obtained in one micro lens array at the same time.

In the micro lens array of the present invention, it is preferable that a refractive index of the lens substrate is set to be two or more (2.5 or more is more preferable). By doing that, the micro lens array can be thin.

According to another aspect of the present invention, there is provided a manufacturing method of a micro lens array, comprising the steps of: (a) preparing a lens substrate; (b) forming a first resist layer in accordance with a first lens pattern extending to a first direction on one principal surface of the lens substrate; (c) shaping the first resist layer into a first convex lens shape by a thermal reflow process; (d) forming a second resist layer to overlap and cross with the first resist layer in accordance with a second lens pattern extending to a second direction crossing with the first direction at a right angle on said one principal surface after the step (c), wherein a width of the second resist layer decreases at an intersection of the first and the second resist layers;

(e) shaping the second resist layer into a second convex lens shape by a thermal reflow process; and (f) forming lens surfaces by transferring the first and the second convex lens shapes to said one principal surface by a dry etching process.

According to the manufacturing method of the micro lens array of the present invention, when the second resist layer is formed to overlap and cross with the first resist layer in accordance with a second lens pattern extending to a second direction crossing with the first direction at a right angle on said one principal surface, wherein a width of the second resist layer decreases at an intersection of the first and the second resist layers. By doing that, as explained later with reference to FIG. 17 and FIG. 28, when the second thermal reflow process is executed on the second resist layer, the radiuses of the curvatures around the top and the foot can be same on the second resist layer.

In the manufacturing method of the present invention, the radius of curvatures of the first direction is determined in accordance with the radius of curvatures in the first direction on the second resist layer, and the radius of curvatures of the second direction are determined in accordance with the radius of curvatures in the second direction on the first resist layer. That is, the radiuses of curvatures of the first and the second direction can be independently determined in accordance with the radius of curvatures of first and the second resist layers. Therefore, the toroidal lens surfaces having independently set the radiuses of curvatures in two directions crossing with each other can be obtained.

The manufacturing method of the present invention is preferable to further comprises the steps of: (g) forming a third resist layer in accordance with a third lens pattern extending to the first direction on another principal surface of the lens substrate after the step (e); (h) shaping the third resist layer into a third convex lens shape by a thermal reflow process; (i) forming a fourth resist layer to overlap and cross with the third resist layer in accordance with a fourth lens pattern extending to the second direction crossing with the first direction at a right angle on said another principal surface after the step (h), wherein a width of the fourth resist layer decreases at an intersection of the third and the fourth resist layers; (j) shaping the fourth resist layer into a fourth convex lens shape by a thermal reflow process; and (k) forming lens surfaces by transferring the third and the fourth convex lens shapes to said another principal surface by a dry etching process before or after the step (f).

According to the present invention, since the single body micro lens array having the collimate function and the telescope function can be realized, time to precisely define the positions of plurality of the lens substrates to the laser light source as in the conventional technique, and at the same time the positioning gap of the optical axes due to changes in an environment can be decreased. Moreover, the micro lens array according to the present invention needs fewer parts for manufacturing so that the manufacturing cost will be decreased and miniaturization of the optical system can be realized.

Moreover, when the toroidal lens surface is formed on one principal surface or both principal surfaces of the lens substrates, the radiuses of curvatures in two directions crossing with each other can be determined respectively and independently.

BRIEF DESCRIPTION OF THE DRAWINGS

FIG. 6A is a plan view showing an example of a substrate holder used for the present invention, and FIG. 6B is a side view of the substrate holder in FIG. 6A from the right.

DETAILED DESCRIPTION OF THE PREFERRED EMBODIMENTS

Figure 1:
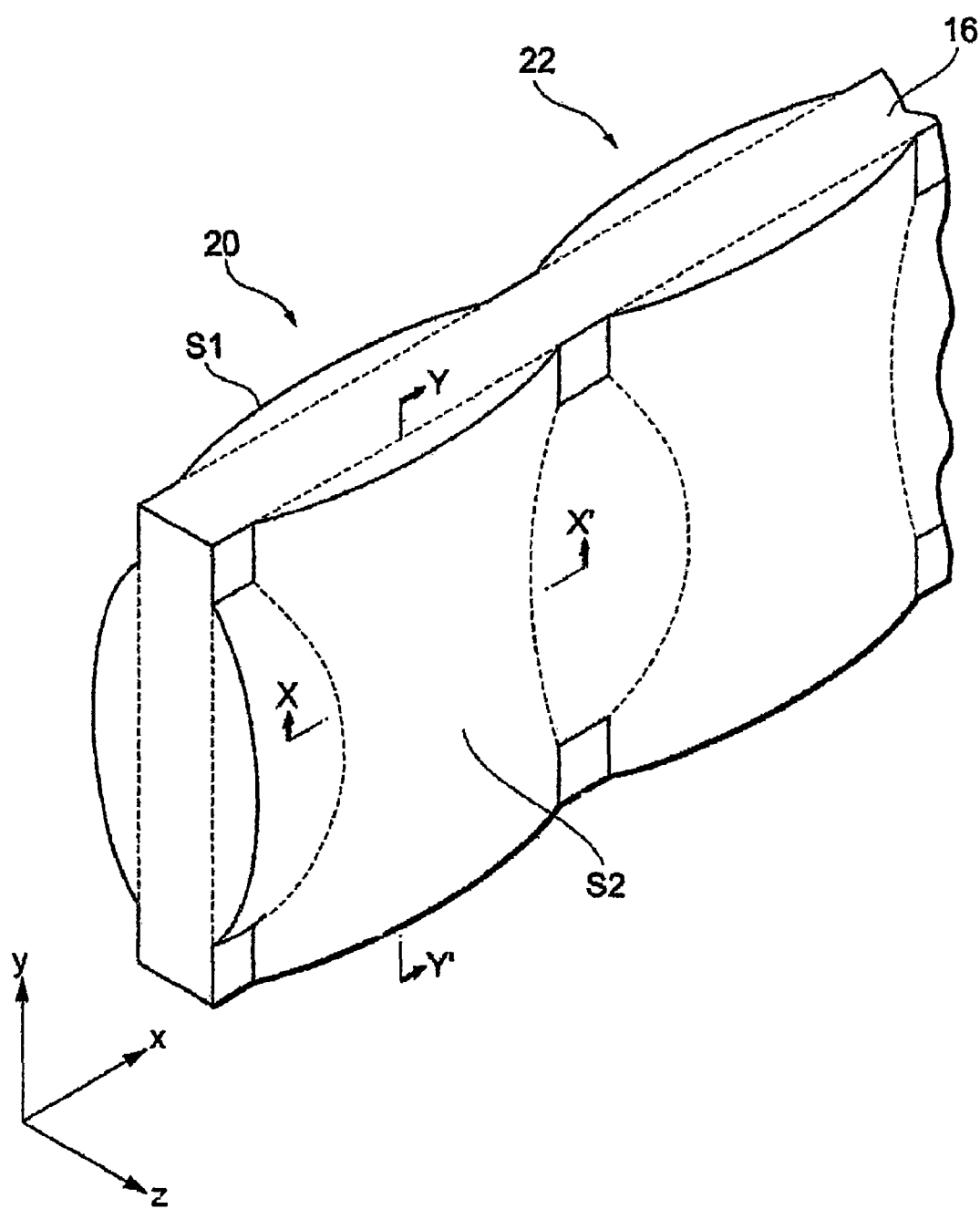
FIG. 1 is a perspective view showing a micro lens array according to one embodiment of the present invention.
Figure 2:
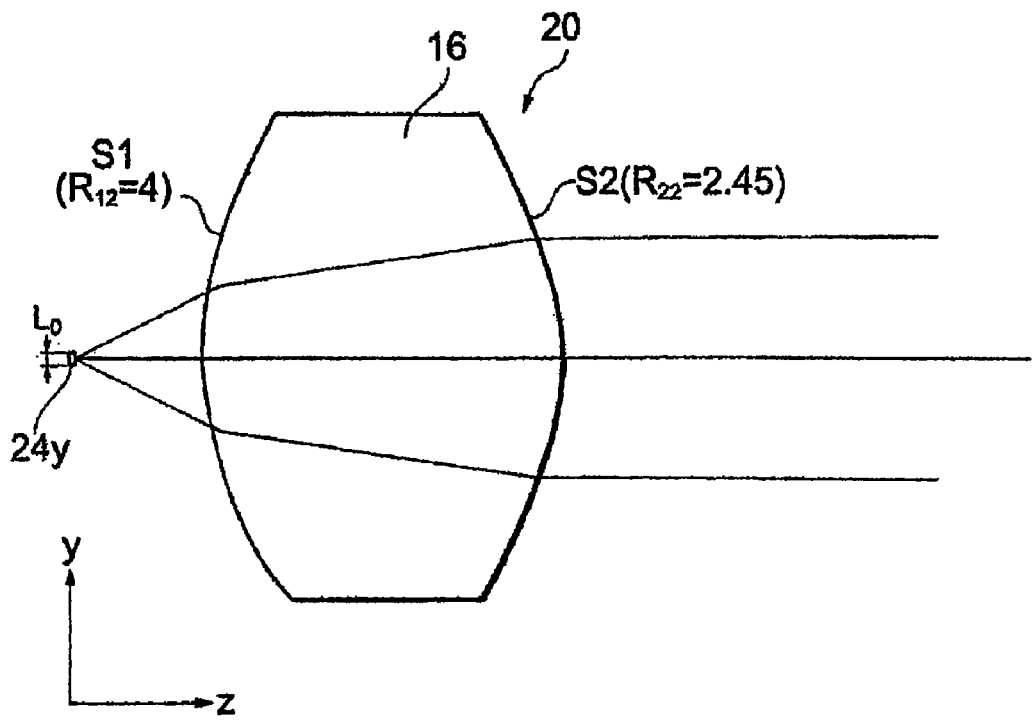
FIG. 2 is a cross sectional view of a lens surface 20 along a line Y to Y' in FIG. 1.
Figure 3:
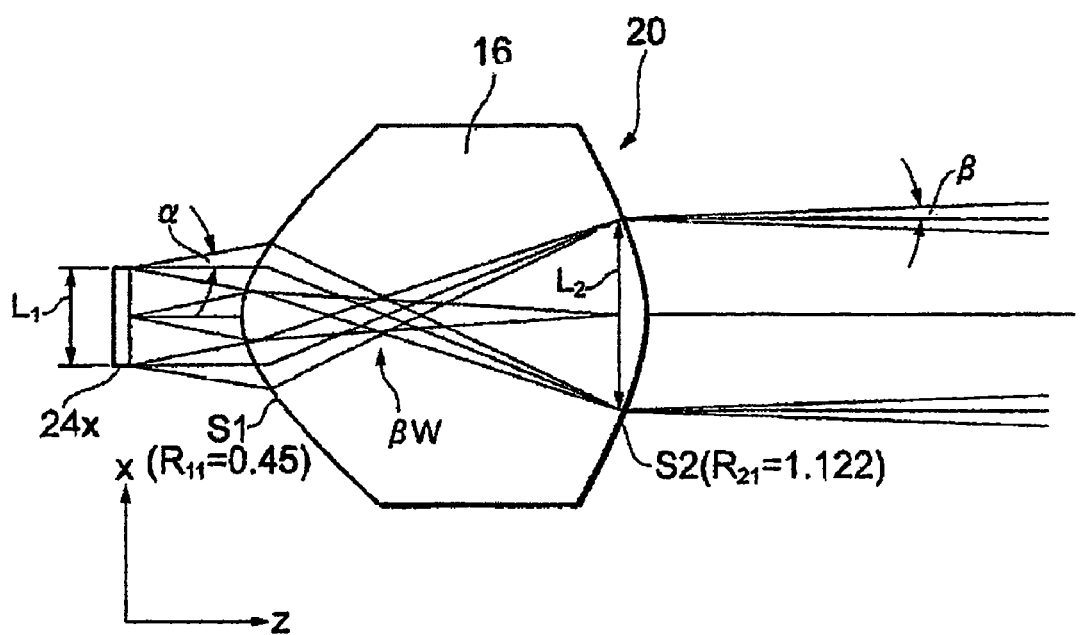
FIG. 3 is a cross sectional view of the lens surface 20 along a line X to X' in FIG. 1.

FIG. 1 shows a micro lens array according to one embodiment of the present invention. FIG. 2 is a cross sectional view of the lens surface 20 along a line Y to Y' in FIG. 1. FIG. 3 is a cross sectional view of the lens surface 20 along a line X to X' in FIG. 1.

A lens substrate 16 is configured by a transparent material composed of a single crystalline of oxide Titan ($TiO_2$) called a rutile. The single crystalline of the rutile can obtain a high refractive index (a normal refractive index is 2.5185 and an abnormal refractive index is 2.7907) by agreeing with the crystalline axis in the optical axis direction. As the transparent material, zirconium oxide, lithium niobate, lithium tantalate, molybdic acid lead, tellurium dioxide, strontium titanate or the like can be used. As shown in FIG. 3, when the laser beam is dispersed for about 10 degree in the x axis direction, it is desirable that the refractive index of the transparent material will be two or more (2.5 or more is preferable) in order to form the beam waist BW on the substrate 16. The formation of the beam waist BW becomes easy so that the refractive index of the transparent material composing the lens substrate 16 becomes high.

A plurality of the lens surfaces 20,22 and so on are positioned as annexes on the lens substrate 16. The structures of these lens surfaces are the same, and the structure of the lens surface 20 is explained as a representation. On one principal surface and another principal surface of the lens substrate 16, the toroidal lens surfaces S1 and S2 are formed respectively.

On the lens surface S1, the radius curvature $R_{12}$ in the y axis direction is set to be 4 mm as shown in FIG. 2, and the radius curvature $R_{11}$ in the x axis direction is set to be 0.45 mm ($R_{11}<R_{12}$) as shown in FIG. 3. On the lens surface S2, the radius curvature $R_{22}$ in the y axis direction is set to be 2.45 mm as shown in FIG. 2, and the radius curvature $R_{21}$ in the x axis direction is set to be 1.222 mm ($R_{21}<R_{22}$) as shown in FIG. 3. The four lens surfaces respectively having the radiuses curvatures $R_{11}$, $R_{12}$, $R_{21}$ and $R_{22}$ may be non-spherical lens surfaces. The thickness of he lens surfaces (distance from the top of the lens surface S1 to the top of the lens surface S2) is set to be 2.6 mm, and a lens array pitch (distance between the center of the adjoining lens surfaces 20 and 22) is set to be 390 μm.

A simulation experiment of the above-described lens surface 20 was executed. The semiconductor laser emitting the laser light with a wave-length of 805 nm was used as the laser light source. The width $L_0$ of the beam 24$y$ in the y axis direction shown in FIG. 2 was set to be 1 μm, and the width $L_1$ of the beam 24$x$ in the x axis direction shown in FIG. 3 was set to be 200 μm. Moreover, the beam dispersion angle (whole angle) in the y axis direction was set to be 56.8 degrees, and the beam dispersion angle (whole angle) in the x axis direction was set to be 8.6 degrees.

Figure 4:
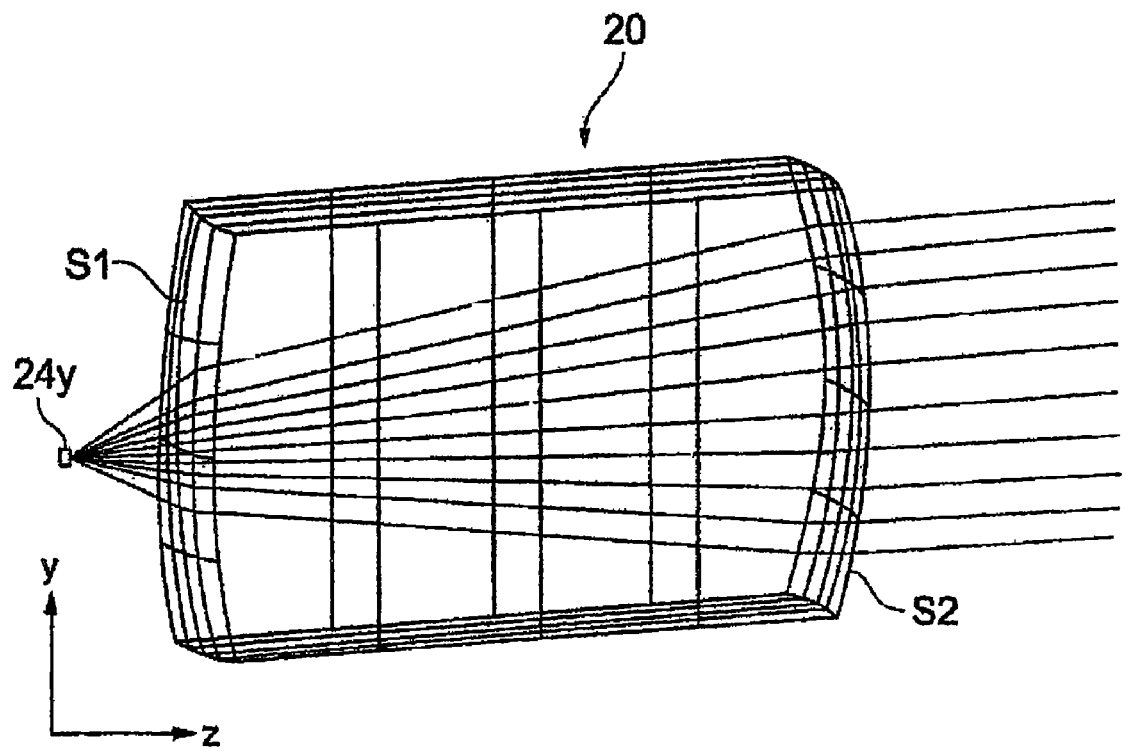
FIG. 4 is a light path view showing a simulation result in the y axis direction of the lens surface 20.
Figure 5:
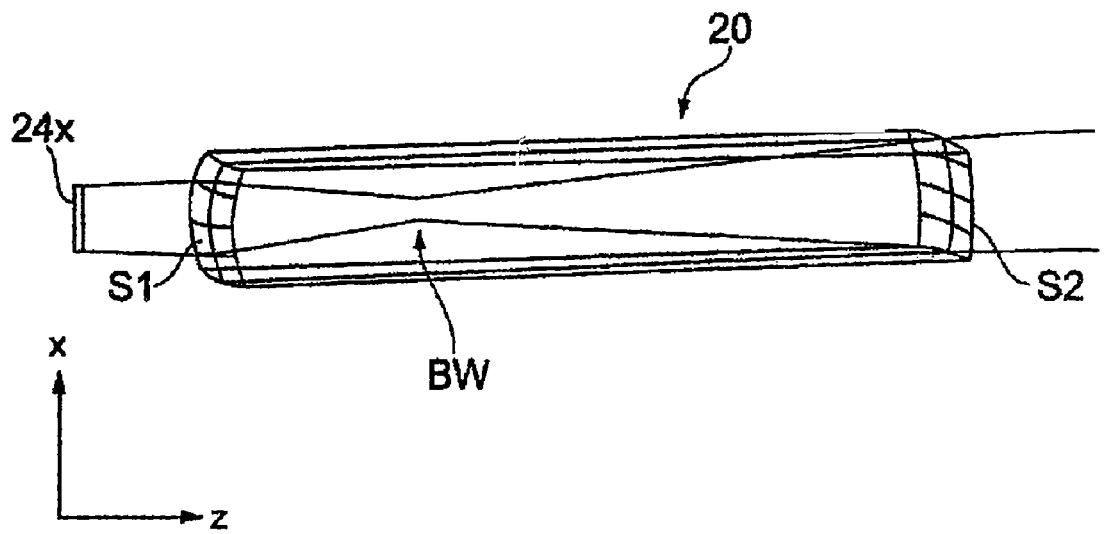
FIG. 5 is a light path view showing a simulation result in the x axis direction of the lens surface 20.

FIG. 4 shows a simulation result in the y axis direction of the lens surface 20. FIG. 5 is a light path view showing a simulation result in the x axis direction of the lens surface 20. FIG. 4 shows the laser beams are collimated (the laser beams are placed in parallel), and FIG. 5 shows that the beam waist BW is formed on the laser beam by the telescope function. FIG. 2 and FIG. 3 respectively show the simulation result in FIG. 4 and FIG. 5. FIG. 2 shows the collimation, and FIG. 3 shows the beam waist. The dispersion angle of the laser beam became 0.2 deg or less in the full angle by a collimate function of the lens surface 20. Moreover, the dispersion angle at the irradiating surface side of the lens surface Si is defined as α as shown in FIG. 3, and the beam width and the dispersion angle at the emitting side of the lens surface S2 are respectively defined as $L_2$ and β, $αL_1$ will be $βL_2$ ($αL_1=βL_2$) by the Lagrange Invariant. Since $L_1$ is smaller than $L_2$ ($L_1<L_2$), the dispersion angle β will be smaller than the dispersion angle α(β<α). In the example that α is 4.3 deg, β became 2.2 deg, and decrease in the dispersion angle could be realized.

Figure 25:
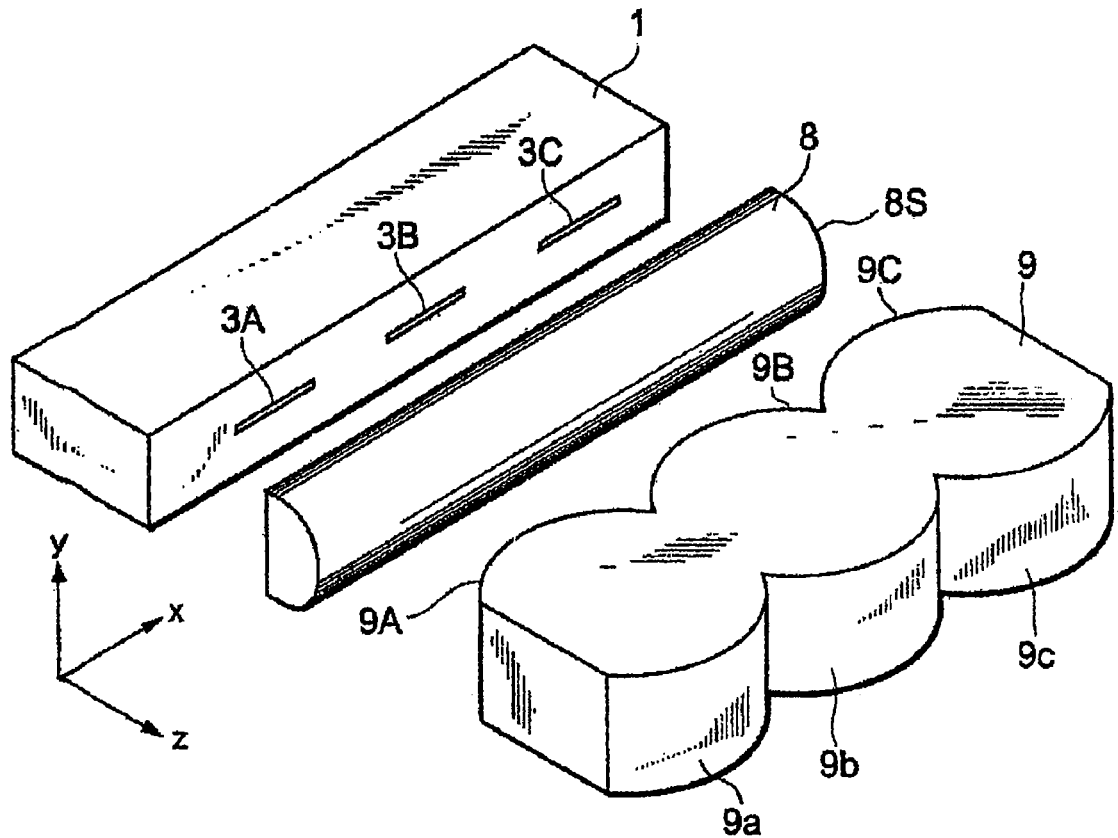
FIG. 25 is a perspective view showing an example of the conventional optical system for restraining the light dispersion.
Figure 26:
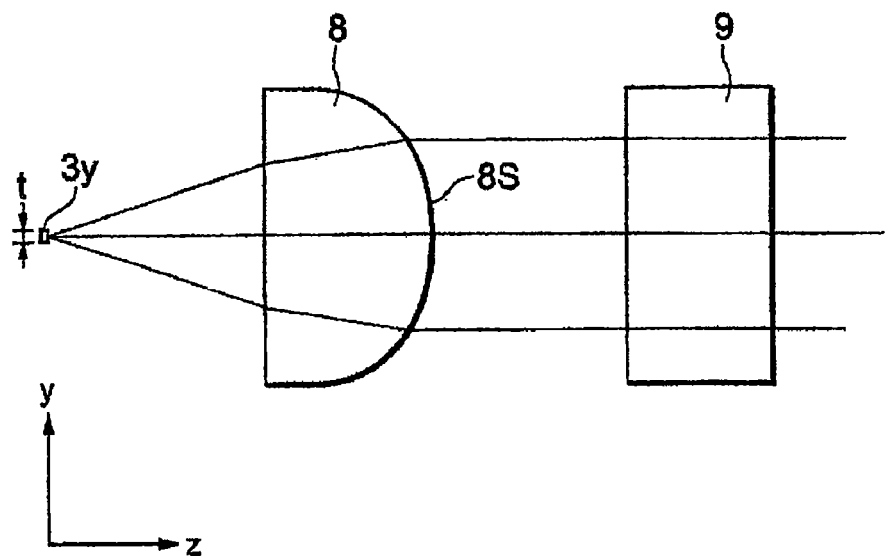
FIG. 26 is a light path view showing the collimation in the optical system in FIG. 25.
Figure 27:
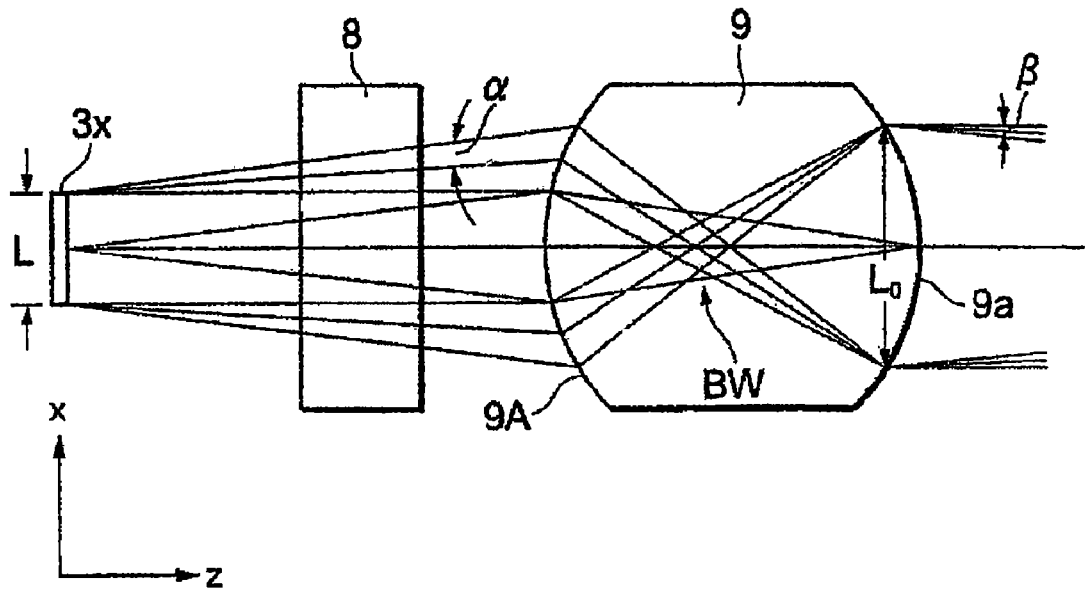
FIG. 27 is a light path view showing the beam waist formation in the optical system in FIG. 25.
Figure 28:
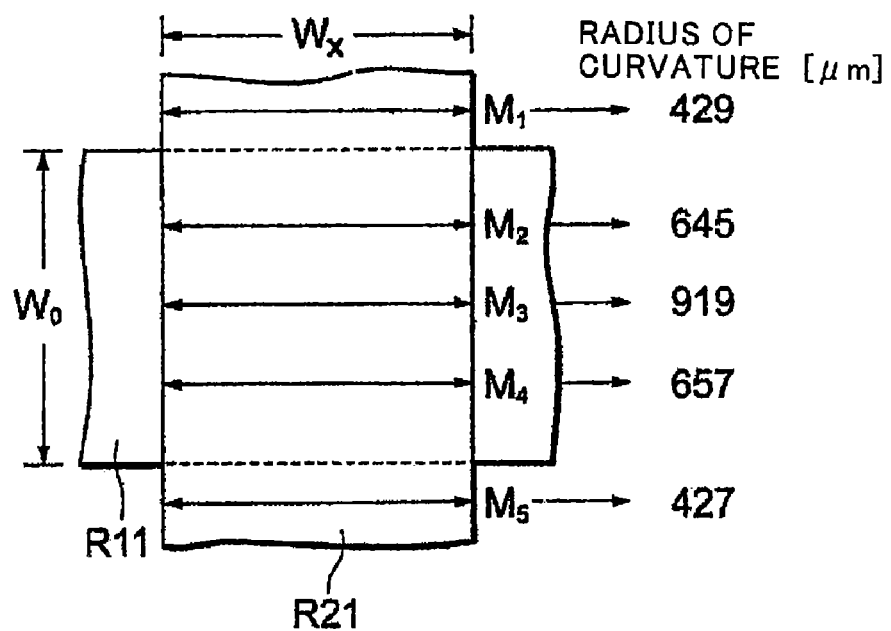
FIG. 28 is a plan view showing change in the radius curvature in the estimated lens surface forming part.

According to the above-described embodiment of the present invention, the light dispersion in any direction of x and y axes can be restrained by using the single (single body) lens substrate 16 formed the toroidal lens surfaces S1 and S2 on both surfaces. Therefore, it is not necessary that the two lens substrates 8 and 9 are used as shown in FIG. 25.

The example of the rutile is shown as the radiuses curvatures $R_{11}$, $R_{12}$, $R_{21}$ and $R_{22}$ of the lens surfaces S1 and S2 with reference to FIG. 2 and FIG. 3. When lithium tantalate (LiTaOa) is used as the transparent material, each radius curvature will be: $R_{11}$=0.55 mm; $R_{12}$=1.8 mm; $R_{21}$=1.29 mm; and $R_{22}$=4.3 mm. Also, in this example, the following condition is satisfied: $R_{11}<R_{12}<R_{21}<R_{22}$.

Next, the above-described manufacturing method of the micro lens array will be explained with reference to FIG. 6 to FIG. 21.

FIG. 6A is a plan view showing an example of a substrate holder used for the present invention, and FIG. 6B is a side view of the substrate holder in FIG. 6A from the right.

The substrate holder 10 is a frame-shaped flat board having a quadrilateral-shaped holding hole 10A for maintaining the quadrilateral-shaped lens substrate 16 composed of, for example, a quartz and has an outward appearance of a square as an example. Moreover, the substrate holder 10 is composed of an aluminum frame with a length D of one side 76.2 mm. The thickness d of the substrate holder 10 is almost same as the thickness of the lens substrate 16. As the material of the substrate holder 10, ceramic material such as glass, alumina or metal such as stainless or invar, etc. can be used.

Figure 7:
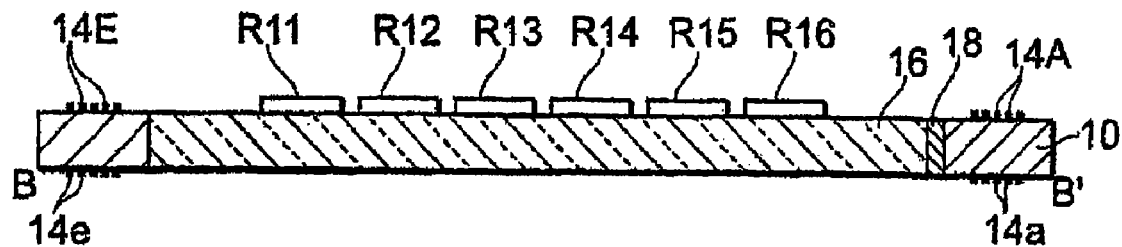
FIG. 7 is a cross sectional view showing a resist layer forming process according to an example of a manufacturing method of the micro lens array according to the present invention.

On one principal surface of (front surface) of the substrate holder 10, position adjusting marks 14A to 14D are formed on one side of the holding hole 10 and position adjusting marks 14E to 14H are formed on another side of the holding hole 10A. On another principal surface of (back surface) of the substrate holder 10, four pairs of position adjusting marks are formed corresponding to the position adjusting marks 14A to 14D and four pairs of the position adjusting marks are formed corresponding to the position adjusting marks 14E to 14Ho. Position adjusting marks 14a and 14e on the back surface respectively corresponding to the position adjusting marks 14A and 14E on the front surface side are shown in FIG. 7. As each position adjusting mark such as 14A, a diffraction grating generally used in a stepper (projection lithography) or a mark with a contrast that can be executed image processing.

In the substrate holder 10, screw holes 10a and 10b fitting with fixing screws 12a and 12b are arranged on one side $A_1$, and screw holes 10c and 10d fitting with fixing screws 12c and 12d are arranged on a side $A_2$ adjoining to the $A_1$. Each screw hole such as A is formed to reach to the holding hole 10A. Moreover, the manufacturing method of the substrate holder 10 is disclosed in the Japanese Patent Application 2005-237414 by the same inventor of the present invention, entire contents of which are incorporated herein by reference.

In the holding hole 10A of the substrate holder 10, an L-shaped spacer 18 is configured to a predetermined corner CN of sides $A_1$ and $A_2$. The spacer 18 is, for example, made of metal and has a thickness almost same as the substrate holder 10. For the material of the spacer 18, resin, glass or ceramic material may be used. In the holding hole 10A of the substrate holder 10, the lens substrate 16 is positioned at a corner LC that is an opposing corner of the predetermined corner CN and a spacer 18 is intervened between the lens substrate 16 and the side wall of the holding hole 10A. The spacer 18 has almost same thickness as the lens substrate 16.

When the substrate holder 10 is used, the fixing screws 12a to 12d are screwed into the screw holes 10a to 10d to press and fix the lens substrate 16 against the corner LC via the spacer 18 by the fixing screws 12a to 12d with arranging the lens substrate 16 and the spacer 18 as shown in FIG. 6A in the holding hole 10A of the substrate holder 10 placed on a flat surface. FIG. 7 is a cross sectional view along the line b to b' in FIG. 6A, and the lens substrate 16 has perfectly flat surfaces on both front and back sides with the spacer 18 and the substrate holder 10.

Next, an example of the micro lens array according to this embodiment will be explained with reference to FIG. 7 to FIG. 21. In the process in FIG. 7, the lens substrate 16 and the spacer 18 are fixed in the holding hole 10A of the substrate holder as described in the above. Thereafter, the resist layers R11 to R16 are formed in parallel on the principal surface (front surface) of the lens substrate 16 on one side of the substrate holder 10 by the well-known photolithography process.

Figure 16:
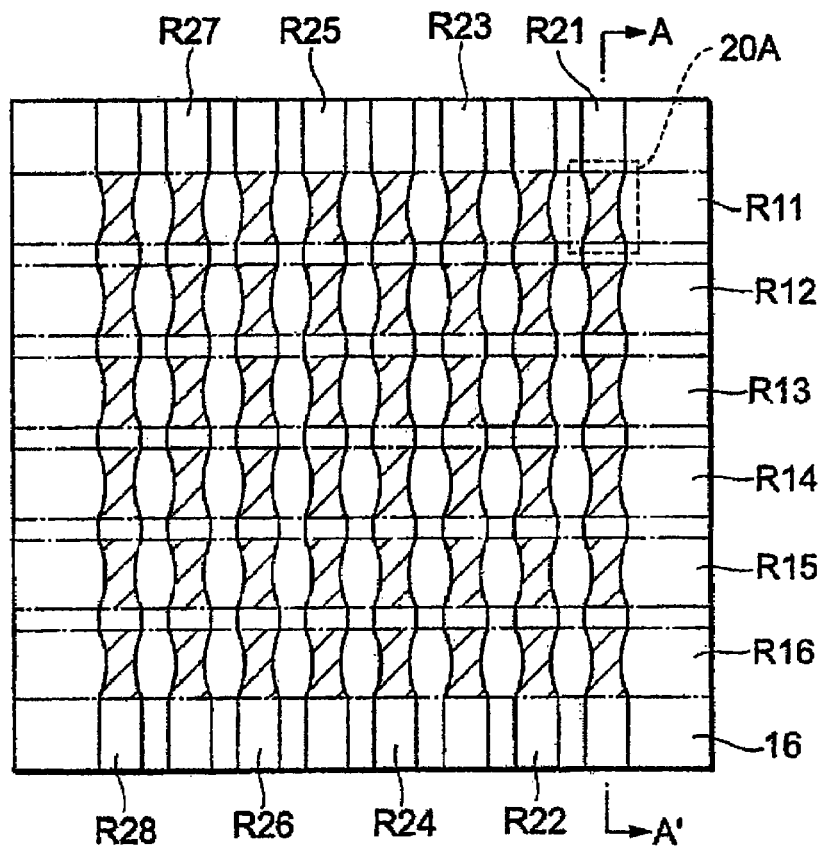
FIG. 16 is a plan view showing positioning of the resist layer in the process in FIG. 9.

The cross section of the substrate 16 shown in FIG. 7 corresponds to the cross section of the line A to A' in FIG. 16. The resist layers R11 to R16 are formed in accordance with a belt pattern extending to the direction (x axis direction) crossing at a right angle with the line A to A' (y axis direction) as shown in FIG. 16. In this photolithography process, since the front surface of the lens substrate 16 has a perfectly flat surface with the spacer 18 and the substrate holder 10, the resist layer can be formed with a uniform thickness to the peripheral area of the lens substrate 16. Moreover, an exposing process is executed by using a one-side stepper, and a resist exposure is executed with positioning a photo mask on the lens substrate 16 by using the position adjusting marks such as 14A, 14E and the like.

Figure 8:
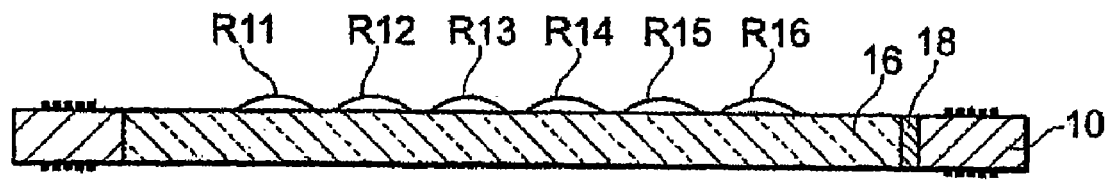
FIG. 8 is a cross sectional view showing the thermal reflow process following to the process in FIG. 7.
Figure 17:
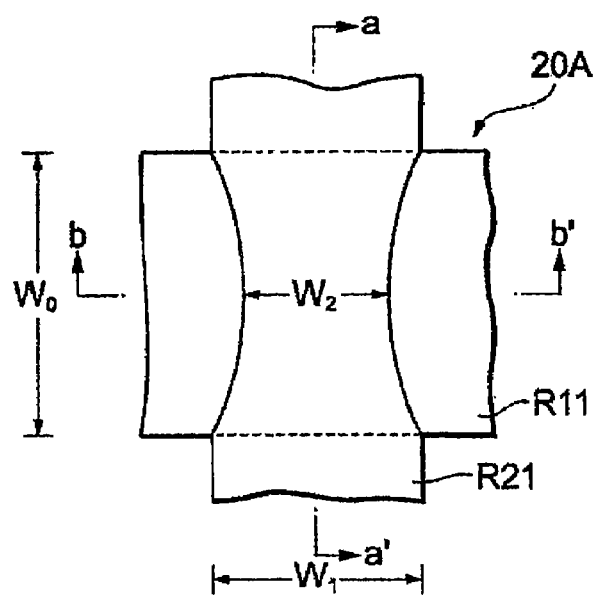
FIG. 17 is an enlarged plan view showing an estimated lens surface forming part 20A in FIG. 16.
Figure 18:
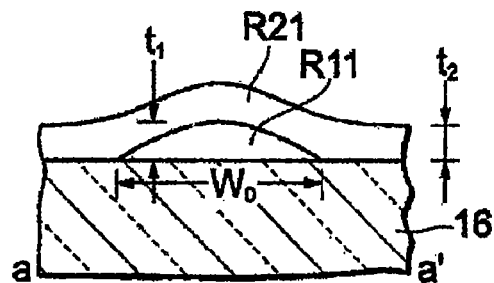
FIG. 18 is a cross sectional view along a line to a' in FIG. 17.
Figure 19:
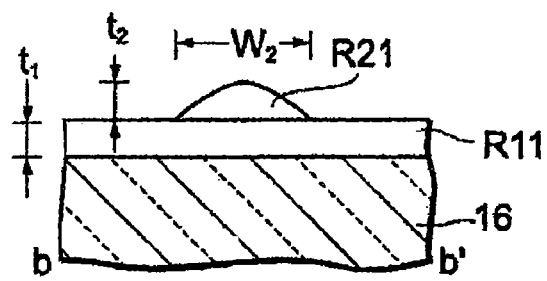
FIG. 19 is a cross sectional view along b line to b' in FIG. 17.

In a process in FIG. 8, a convex lens shape is given to each resist layer such as R11 by executing a thermal reflow process to the resist layers R11 to R16. FIG. 18 is a cross sectional view along the line a to a' (y axis direction) in FIG. 17. FIG. 19 is a cross sectional view along the line b to b' (x axis direction) in FIG. 17. The resist layer R11 is shaped in the convex lens shape having width $W_0$ and thickness $t_1$ as shown in FIG. 18 and FIG. 19. This is the same as other resist layers R12 to R16. The width $W_0$ and the thickness $t_1$ are determined in accordance with the desired radius of curvature.

Figure 9:
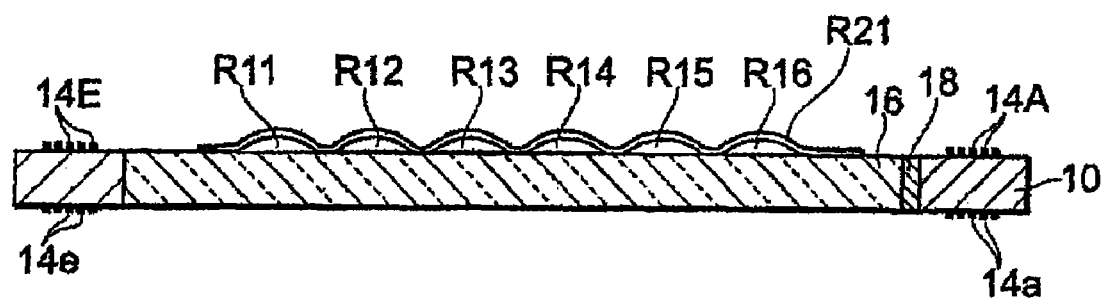
FIG. 9 is a cross sectional view showing the resist layer forming process and the thermal reflow process following to the process in FIG. 8.

In a process in FIG. 9, resist layers R21 to R28 shown in FIG. 16 are formed on the front surface of the lens substrate 16 on one side of the substrate holder 10 by the photolithography process in accordance with the belt pattern extending to the direction (y axis direction) in parallel to the line A to A'. This photolithography process can be executed as same as in the process in FIG. 7.

In the process in FIG. 9, the resist layers R21 to R28 are formed to have their width gradually decrease from both foot areas of the lower resist layer to the top at the crossing point with the lower resist layer such as R11. FIG. 17 is an enlarged plan view showing an estimated lens forming part 20A including the crossing point of the lower resist layer R11 and the upper resist layer R21 and the peripheral area in FIG. 16.

After forming the resist layers R21 to R28, a thermal reflow process is executed on the resist layers R21 to R28 to shape them in a convex lens shape. For example, the resist layer R21 is shaped in the convex lens shape with the width $W_2$ and the thickness $t_2$ at the top of the resist layer R11 as shown in FIG. 19. This is the same as other estimated lens forming part corresponding to the crossing point of the upper and lower resist layers. The width $W_2$ and the thickness $t_2$ are determined in accordance with the desired radius of curvature.

The resist layer R21 is formed of which width gradually decreases from $W_1$ to $W_2$ toward the top of the resist layer R11 as shown in FIG. 17 in order to adjust the radius of curvature of the curved surface formed on the resist layer 21 by the thermal reflow process as shown in FIG. 18. If the resist layer R21 is formed with uniform width $W_1$ from the foot of one side to the foot of another side of the resist layer R11, the resist layer R21 becomes thin as approaching to the top of the resist layer R11. Thereafter, when the thermal reflow process is executed, the radius of curvature around the top is larger than that at the foot on the resist layer R21.

For example, it is defined that the resist layer R21 is formed with the width $W_x$ and that $W_x$ is 320 µm ($W_x$=320 µm). When the radiuses of curvature in the direction (x axis direction) crossing at a right angle with the longitudinal direction of the resist layer R21 are measured at measuring points $M_1$ to $M_5$ shown in the drawing along a path from one foot to another foot via the top of the resist layer R21 after executing the thermal reflow process to the resist layer 21, the radiuses of curvature at the measuring points $M_1$ and $M_5$ corresponding to both foot of the resist layer R21 are relatively small and the radius of curvature at the measuring point $M_3$ corresponding to the top of the resist layer R21 is maximum as shown in the drawing.

Figure 21A:
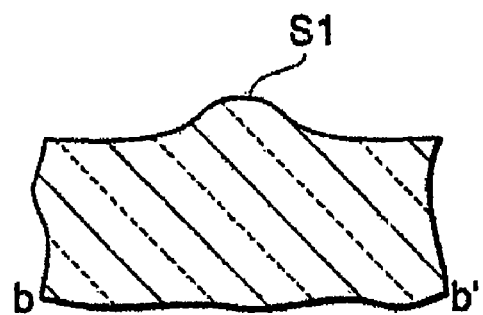
FIG. 21A and FIG. 21B are cross sectional views respectively corresponding to the lines b to b' in FIG. 17 showing lens surfaces S1 and S2.

In this embodiment, since the resist layer R21 has a width gradually decreasing as approaching to the top as described in the above, the radius of curvature of the top area can be almost same as that of foot area on the resist layer R21 after executing the thermal reflow process on the resist layer R21. Therefore, in a dry etching process described in the below, the lens surface S1 having the radius of curvature corresponding to the radius of curvature in the direction of the line b to b' (x axis direction) of the resist layer R21 in FIG. 19 can be obtained as shown in FIG. 21A. The above-described lens surface formation of the estimated lens surface forming part 20A is applicable similarly to other estimated lens surface forming part corresponding to the crossing point of the upper and lower resist layers.

Figure 10:
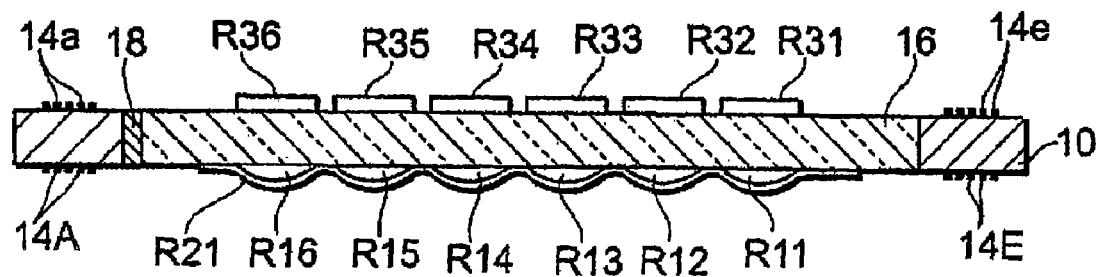
FIG. 10 is a cross sectional view showing a thermal reflow reverse process and the resist layer forming process following to the process in FIG. 9.

In a process in FIG. 10, the substrate holder 10 is turned upside-down with holding the lens substrate 16. As a result, another surface of the substrate holder 10 where the position adjusting marks such as 14a and 14e have been formed becomes an upper surface. In this state, the resist layers R31 to R36 are formed in parallel and respectively facing to the resist layers R11 to R16 on another principal surface (back surface) of the lens substrate 16 on another side of the substrate holder 10 by the photolithography process. This photolithography process can be executed as same as the process in FIG. 7. In this case, since the resist exposure is executed with positioning a photo mask on the lens substrate 16 by using the position adjusting marks such as 14A, 14E and the like, positioning precision of the resist layers R31 to R36 to the resist layers R11 to R16 can be extremely high.

Figure 11:
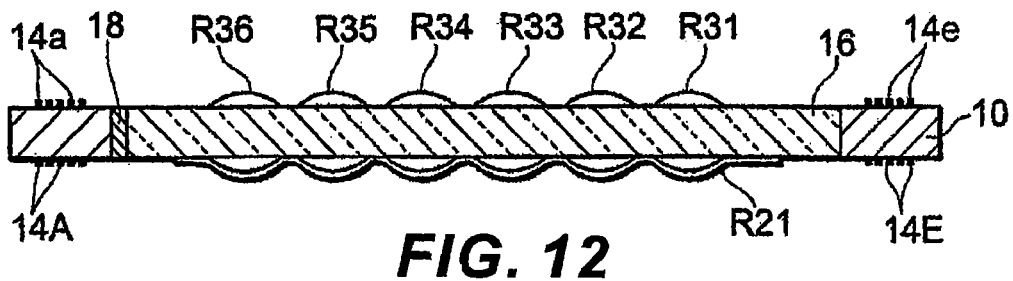
FIG. 11 is a cross sectional view showing the thermal reflow process following to the process in FIG. 10.

In a process in FIG. 11, each resist layer such as R31 is shaped in a convex lens shape by executing a thermal reflow process on the resist layers R31 to R36. The similar convex lens shape as the resist layer R11 is added to each resist layer such as R31 although the width and the thickness is different from the resist layer R11 shown in FIG. 18. The width and the thickness of each resist layer such as R31 are determined in accordance with the desired radius of curvature.

Figure 12:
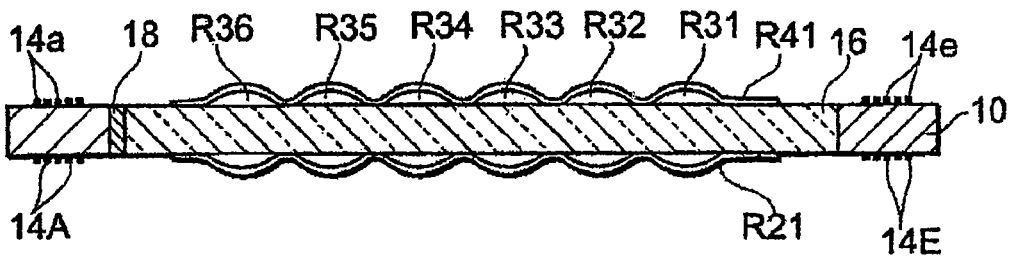
FIG. 12 is a cross sectional view showing the resist layer forming process and the thermal reflow process following to the process in FIG. 11.

In a process in FIG. 12, the resist layers R41 is formed to face with the resist layer R21 on the back surface of the lens substrate 16 on another side of the substrate holder 10 by the photolithography process in accordance with the belt pattern extending to the direction (y axis direction) in parallel to the line A to A'. The resist layer R41 is formed to overlap and cross with the lower resist layers R31 to R36 as described before. Moreover, the resist layer R41 is formed to have a width decreased at the crossing point. However, the width and the thickness of the resist layer R41 are different from those of the resist layer R21. In this photolithography process, the resist layers R42 to R48 (not shown in the drawing) respectively corresponding to the resist layers R22 to R28 in FIG. 16 are formed as same as the resist layer R41.

After forming the resist layers R41 to R48 (R42 to R48 are not shown in the drawing), a thermal reflow process is executed on the resist layers R41 to R48 to shape them into a convex lens shape. The resist layer R41 is shaped in the same convex lens shape as the R21 in FIG. 19 at the top of the resist layer R31. Other estimated lens surface forming parts corresponding to the crossing point of the upper and lower resist layers are shaped in the same manner. The width and the thickness of each resist layer such as R41 are determined in accordance with the desired radius of curvature.

Figure 13:
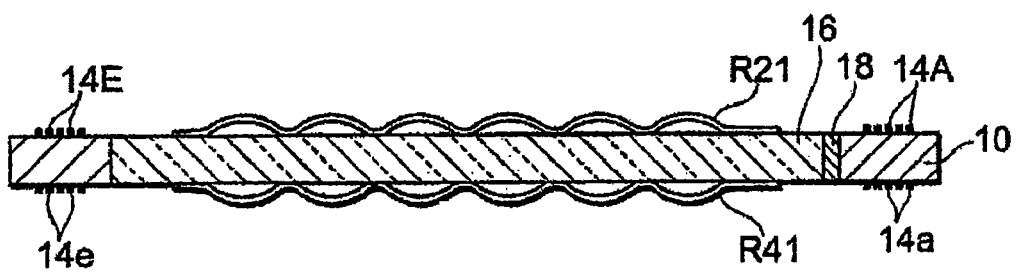
FIG. 13 is a cross sectional view showing a substrate holder reverse process following to the process in FIG. 12.

In a process in FIG. 13, the substrate holder 10 is turned upside-down with holding the lens substrate 16. As a result, the surface of the substrate holder 10 where the position adjusting marks such as 14A and 14E are formed becomes an upper surface. The turning process of the substrate holder in FIG. 13 can be omitted.

Figure 14:
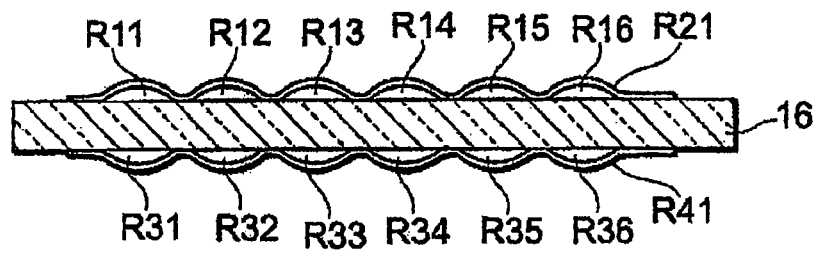
FIG. 14 is a cross sectional view showing a lens substrate removing process following to the process in FIG. 13.

In a process in FIG. 14, the fixing screws 12a to 12d are unscrewed to release the lens substrate 16 from the substrate holder 10. Then, in a process in FIG. 15, toroidal lens surfaces S1 for the numbers (48, for example) of the crossing points (hatched parts in FIG. 16) of the upper and lower resist layers shown in FIG. 16 will be formed by transmitting the convex lens shape on the surface of the lens substrate 16 by a first dry etching process with the R21 to R28 defined as masks. After turning upside down the lens substrate 16, toroidal lens surfaces S2 will be formed facing to the lens surfaces S1 by transmitting the convex lens shape on the back surface of the lens substrate 16 by a second dry etching process with the R41 to R48 (R42 to R48 are not shown in the drawing) defined as masks. Lens part 20 including one lens surface S1 and one lens surface S2 facing to each other is shown in FIG. 15.

Figure 15:
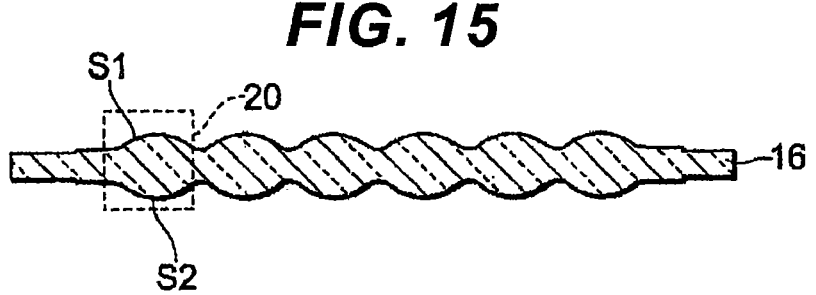
FIG. 15 is a cross sectional view showing a dry etching process following to the process in FIG. 14.
Figure 20A:
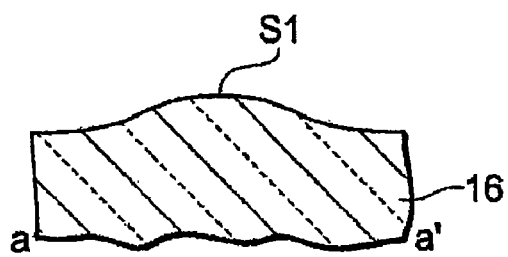
FIG. 20A and FIG. 20B are cross sectional views respectively corresponding to the lines a to a' in FIG. 17 showing lens surfaces S1 and S2.
Figure 20B:
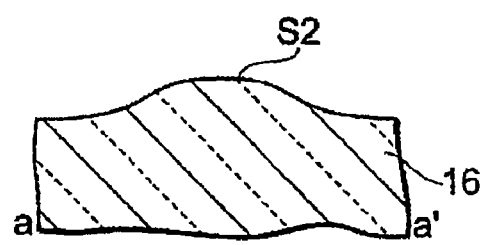
Figure 21B:
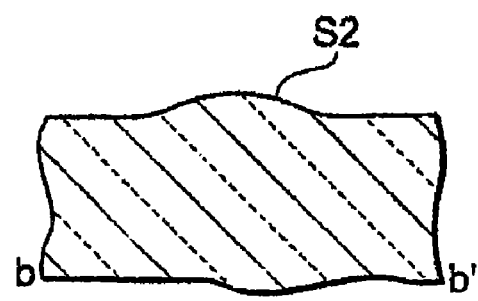

FIG. 20 and FIG. 21 are cross sectional views of the lens part 20 in FIG. 15. FIG. 20A and FIG. 21A are cross sectional views respectively corresponding to the lines a to a' and the line b to b' on the lens surfaces S1. FIG. 20B and FIG. 21B are cross sectional views respectively corresponding to the lines a to a' and the line b to b' in FIG. 17 on the lens surfaces S2.

On the lens surface S1 shown in FIG. 20A and FIG. 21A, the radius of curvature in the direction of a to a' (y axis direction) is determined in accordance with the radius of curvature of the resist layer R11 in FIG. 18, and the radius of curvature in the direction of b to b' (x axis direction) is determined in accordance with the radius of curvature of the resist layer R21 in FIG. 19. Therefore, the radius of curvature R12 in the y axis direction shown in FIG. 2 can be obtained by simply setting the width and the thickness of the resist layer R11 in FIG. 18 properly. Moreover, the radius of curvature R11 in the x axis direction can be obtained by simply setting the width and the thickness of the resist layer R21 in FIG. 19 properly.

On the lens surface S2 shown in FIG. 20B and FIG. 21B, the radius of curvature in the direction of the line a to a' (y axis direction) is determined in accordance with the radius of curvature of the resist layer R31 in FIG. 14, and the radius of curvature in the direction of the line b to b' (x axis direction) is determined in accordance with the radius of curvature of the resist layer R41 in FIG. 14. Therefore, the radius of curvature R22 shown in FIG. 2 can be obtained simply by setting the width and the thickness of the resist layer R31 in FIG. 14 properly, and the radius of curvature R21 shown in FIG. 3 can be obtained simply by setting the width and the thickness of the overlapping part with the resist layer R31 in FIG. 14 properly.

Figure 22:
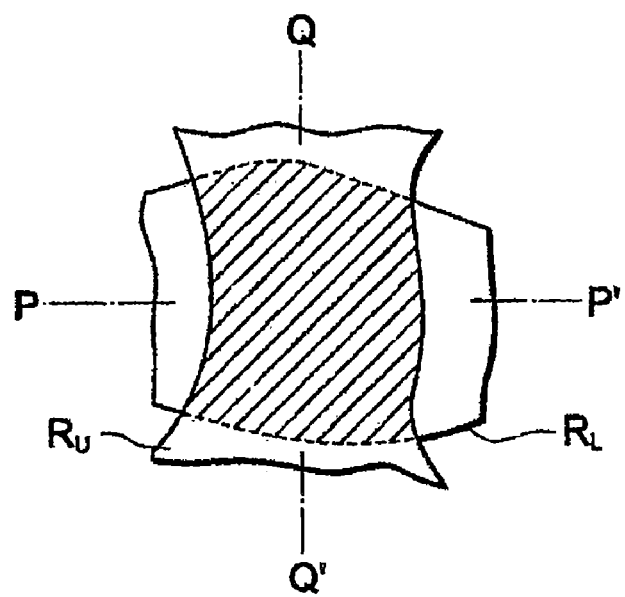
FIG. 22 is a plan view showing the positioning of the resist layer for forming lens surfaces that are not rotation symmetry.
Figure 23:
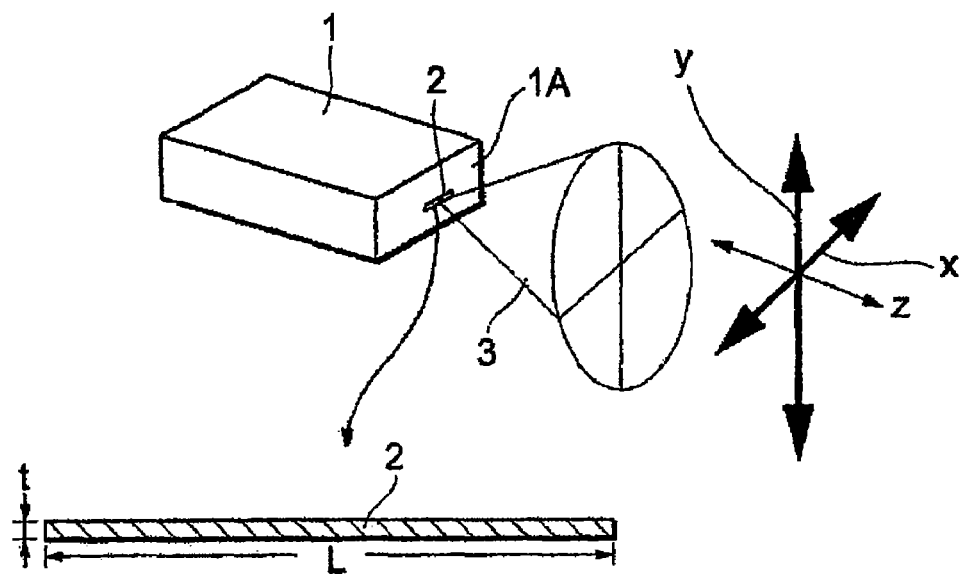
FIG. 23 is a perspective view for explaining the laser beam emitting from the semiconductor laser.
Figure 24:
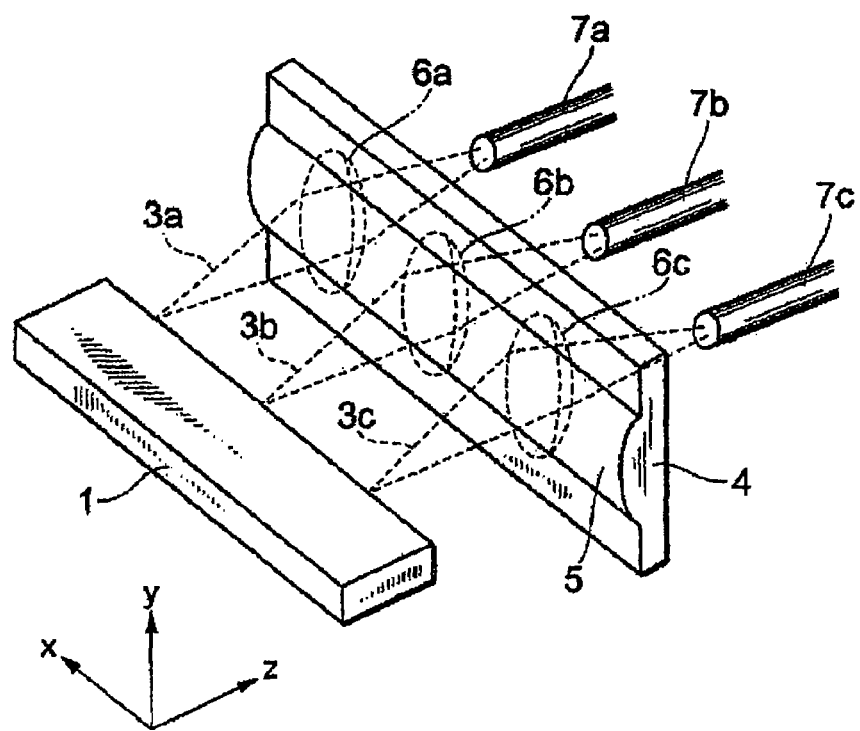
FIG. 24 is a perspective view showing an example of the conventional optical system for concentrating light.

FIG. 22 shows the positioning of the resist layer for forming the lens surfaces that are not rotation symmetry. In this example, an upper resist layer $R_U$ is formed to overlap and cross with the lower resist layer $R_L$ as same as the resist layers R11 and R21. In this case, a plane shape that is asymmetry for the center line P to P' is used as the resist layer $R_L$, and a plane shape that is asymmetry for the center line Q to Q' is used for the resist layer $R_U$. By doing that, the toroidal lens surfaces that are not rotation symmetry can be obtained corresponding to the crossing point (a hatched par in the drawing) of the resist layers $R_L$ and $R_U$.

The present invention has been described in connection with the preferred embodiments. The invention is not limited only to the above embodiments. It is apparent that various modifications, improvements, combinations, and the like can be made by those skilled in the art.

What are claimed are:

1. A micro lens array, comprising:
   a lens substrate;
   a first toroidal lens surface formed on one principal surface of the lens substrate, a radius of curvature $R_{11}$ in a first direction being smaller than a radius of curvature $R_{12}$ in a second direction crossing with the first direction at a right angle; and
   a second toroidal lens surface formed on another principal surface of the lens substrate, a radius of curvature $R_{21}$ in the first direction being smaller than a radius of curvature $R_{22}$ in the second direction, and
   wherein a beam waist of an optical beam irradiating from the first lens surface and emitted from the second lens surface is formed in the lens substrate in the first direction, and the optical beam is collimated in the second direction.

2. A micro lens array according to claim 1, wherein a refractive index of the lens substrate is not less than 2.

3. A manufacturing method of a micro lens array, comprising the steps of:
   (a) preparing a lens substrate;
   (b) forming a first resist layer in accordance with a first lens pattern extending to a first direction on one principal surface of the lens substrate;
   (c) shaping the first resist layer into a first convex lens shape by a thermal reflow process;
   (d) forming a second resist layer to overlap and cross with the first resist layer in accordance with a second lens pattern extending to a second direction crossing with the first direction at a right angle on said one principal surface after the step (c), wherein a width of the second resist layer decreases at an intersection of the first and the second resist layers;
   (e) shaping the second resist layer into a second convex lens shape by a thermal reflow process; and
   (f) forming lens surfaces by transferring the first and the second convex lens shapes to said one principal surface by a dry etching process.

4. A manufacturing method of a micro lens array according to claim 3, further comprising the steps of:
   (g) forming a third resist layer in accordance with a third lens pattern extending to the first direction on another principal surface of the lens substrate after the step (e);
   (h) shaping the third resist layer into a third convex lens shape by a thermal reflow process;
   (i) forming a fourth resist layer to overlap and cross with the third resist layer in accordance with a fourth lens pattern extending to the second direction crossing with the first direction at a right angle on said another principal surface after the step (h), wherein a width of the fourth resist layer decreases at an intersection of the third and the fourth resist layers;
   (j) shaping the fourth resist layer into a fourth convex lens shape by a thermal reflow process; and
   (k) forming lens surfaces by transferring the third and the fourth convex lens shapes to said another principal surface by a dry etching process before or after the step (f).

* * * * *